United States Patent [19]

Tabuchi

[11] Patent Number: 4,994,723
[45] Date of Patent: Feb. 19, 1991

[54] DIGITAL SERVO SYSTEM FOR CONTROLLING ROTATIONAL SPEED OF ROTARY BODY

[75] Inventor: Junichiro Tabuchi, Higashiosaka, Japan

[73] Assignee: Sanyo Electric Co., Ltd., Japan

[21] Appl. No.: 450,851

[22] Filed: Dec. 14, 1989

[30] Foreign Application Priority Data

Dec. 19, 1988 [JP] Japan ................... 63-320929

[51] Int. Cl.$^5$ .................................. G05B 19/18
[52] U.S. Cl. ......................... 318/569; 318/608; 318/603; 388/810
[58] Field of Search ............... 318/569, 608, 603; 388/810

[56] References Cited

U.S. PATENT DOCUMENTS

| 4,584,507 | 4/1986 | Taylor | 318/327 |
| 4,668,900 | 5/1987 | Tabuchi | 318/608 |
| 4,879,754 | 11/1989 | Tadashi | 388/810 |
| 4,885,793 | 12/1989 | Tabuchi | 388/810 |

Primary Examiner—William M. Shoop, Jr.
Assistant Examiner—Saul M. Bergmann
Attorney, Agent, or Firm—Peter L. Michaelson

[57] ABSTRACT

A microcomputer 1 servo controls a rotational speed of a capstan motor 10 in a VTR in a digital manner. A value of a timer counter 6 is stored in an ICR 7 at a timing of each edge of FG signal pulses generated as the capstan motor rotates. Thereafter, in the microcomputer 1, a FG interrupt processing is carried out corresponding to the value of ICR 7. More specifically, the microcomputer 1 alternately measures a first period from a rise of one pulse of the FG signal to a rise of a subsequent pulse thereof and a second period from a fall of one pulse to a fall of a subsequent pulse to determine an amplitude of a speed error signal based on these periods. Therefore, a sampling frequency for the digital servo control can be double that of a prior art.

7 Claims, 4 Drawing Sheets

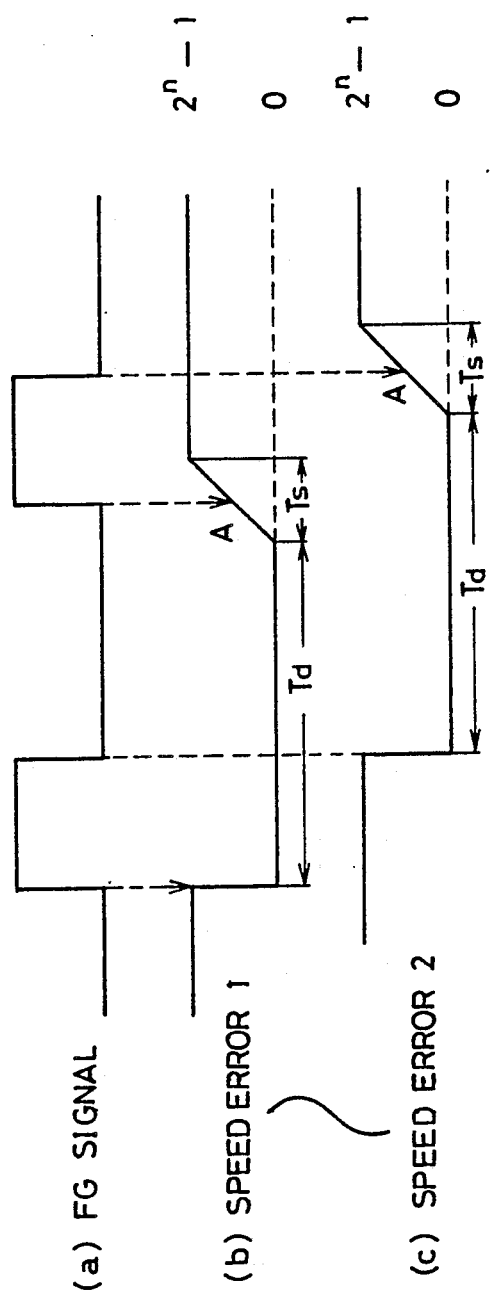

DIGITAL SERVO SYSTEM FOR CONTROLLING ROTATIONAL SPEED OF ROTARY BODY

BACKGROUND OF THE INVENTION

1. Field of the Invention

The present invention relates generally to digital servo systems, and more particularly, to a digital servo system in which controlling of a rotational speed of a rotary body such as a cylinder motor and a capstan motor of a video tape recorder (referred to as VTR hereinafter) is achieved using a microcomputer.

2. Description of the Background Art

Conventionally, in a VTR, there have been provided a cylinder motor for driving the rotation of a rotary head and a capstan motor for driving the travelling of a tape. During the operation of the VTR, rotational speeds of the above described cylinder motor and capstan motor used as driving means are digitally servo controlled in order to accurately control a rotational speed of the rotary head and a traveling speed of the tape.

As described in Japanese Patent Laying-Open No. 61-271644, a digital servo control of a rotational speed of such a motor as a cylinder motor and a capstan motor is performed based on a signal indicating an actually detected rotational speed of the motor, that is, a FG (Frequency Generator) signal comprising a predetermined number (for example 24 numbers) of pulses generated per one rotation of the motor. The higher a frequency of the FG signal, that is, a sampling frequency for a digital servo control is the better will a response speed of a servo loop and response characteristics be of the servo loop for a load fluctuation, that is, controllability over disturbance. This is because if the sampling frequency is low, it becomes difficult to perform a servo control quickly in response to a disturbance which may be caused.

In order to increase the sampling frequency for the servo control, that is, a frequency of the FG signal, it, e.g., has been proposed to improve a structure of a detector itself of the FG signal. More specifically, by increasing the number of magnets constituting the FG signal detector, the number of FG pulses generated per one rotation of the motor is increased to increase the frequency of the FG signal.

However, the increased number of the magnets of the FG signal detector results in a large-sized FG signal detector, which leads to a large-sized motor. Therefore, such a method is not practical to be adopted.

SUMMARY OF THE INVENTION

Therefore, an object of the present invention is to improve response characteristics over a disturbance of a servo loop in a digital servo system for controlling a rotational speed of a rotary body.

Another object of the present invention is to increase a sampling frequency for a digital servo control of a rotational speed of a rotary body such as a motor.

Still another object of the present invention is to increase a frequency of a FG signal without enlarging a motor.

Briefly, the present invention is, in a digital servo system for controlling a rotational speed of a rotary body, to alternately measure a first period from a rise of one pulse of a FG signal having a frequency proportional to the rotational speed of the rotary body to a rise of a subsequent pulse, and a second period from a fall of one pulse of the FG signal to a fall of a subsequent pulse, and generate a speed error signal according to the measured periods, thereby controlling the rotational speed of the rotary body.

Accordingly, a principal advantage of the present invention is that a frequency of the FG signal, that is, a sampling frequency for the digital servo control can be increased and therefore response characteristics of the servo loop over a disturbance can be improved without changing a structure of the FG signal detector.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3B depicts various time periods associated with the waveforms shown in FIG. 3A.

FIG. 4 is a diagram schematically showing a principle of the formation of a speed error signal of a capstan motor.

DESCRIPTION OF THE PREFERRED EMBODIMENTS

Figure 1:
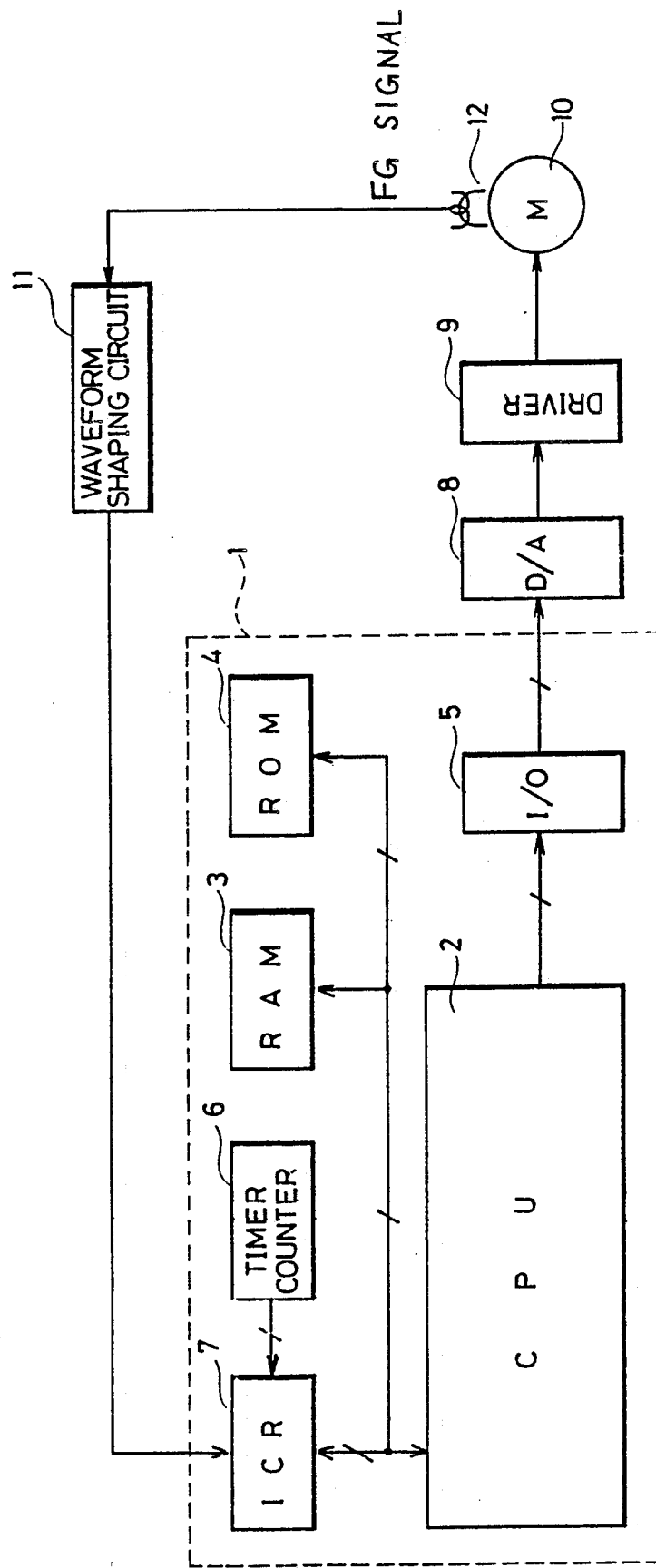
FIG. 1 is a schematic block diagram showing a digital servo system comprising a microcomputer according to one embodiment of the present invention.

Referring to the drawings, embodiments of the present invention will be described in the following.

An embodiment described herein is a digital servo system for controlling a rotation of a capstan motor in a VTR to which the present invention is applied. FIG. 1 is a block diagram schematically showing a structure thereof which is implemented using a microcomputer.

In FIG. 1, a microcomputer 1 basically comprises a CPU 2, a RAM 3, a ROM 4, an input/output (I/O) port 5, a timer counter 6 and an input capture register (ICR) 7. The microcomputer 1 generates an error signal, i.e. a digital servo signal for controlling rotation of a capstan motor 10, which is supplied to the exterior from the I/O port 5. The digital servo signal outputted from the I/O port 5 is converted into an analog signal by a D/A converter 8, and thereafter is applied to a driving circuit 9 of the capstan motor 10 to control rotation thereof.

A FG signal detector 12 is provided to the capstan motor 10, which generates a FG signal corresponding to the rotation of the capstan motor The generated FG signal is waveform-shaped by a waveform shaping circuit 11 and applied to the ICR 7. Then, the microcomputer 1 starts an input capture interrupt processing at timing of a rise and a fall of each pulse constituting the FG signal (i.e. a timing of each edge).

Figure 3A:
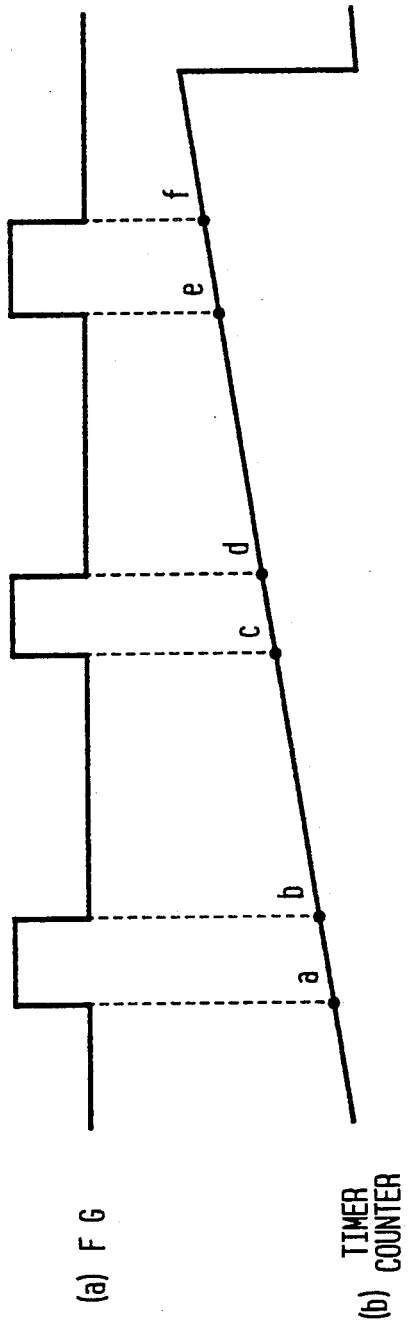
FIGS. 3A and 3B collectively form is a timing chart showing a manner of measuring a frequency of a FG signal according to the present invention, where waveforms (a) and (b) in FIG. 3A respectively depict the FG signal and the contents of timer counter 6, the latter shown in FIG. 1.
Figure 3B:
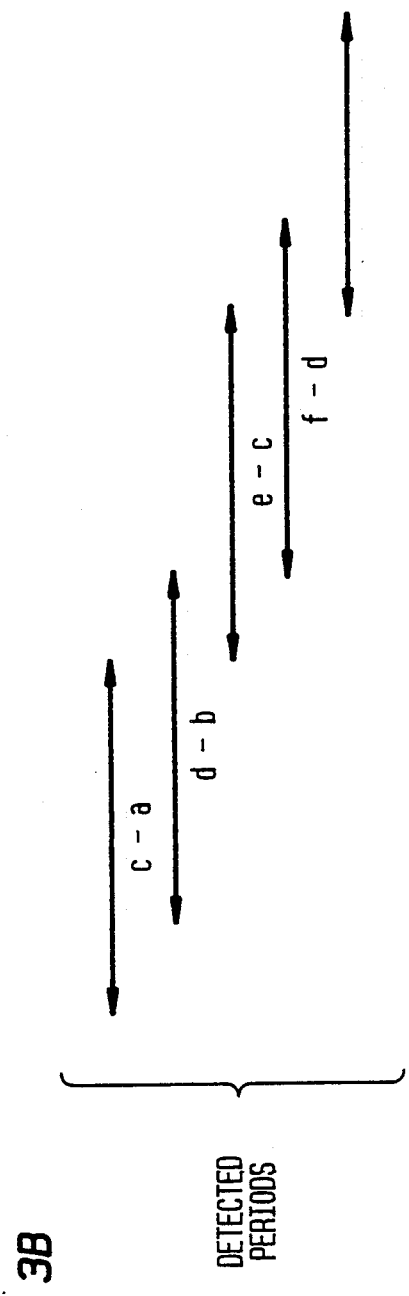

The input capture interrupting operation will be briefly described in the following. The microcomputer 1, as will be described later in detail, measures a period of the FG signal and generates a speed error signal corresponding thereto. In measuring the period of the FG signal, a counted value of the timer counter 6 which repeats a counting operation of a clock signal from a clock signal source (not shown) is used. FIGS. 3A and 3B collectively show such a manner of measuring the period of the FG signal wherein waveform (a) in FIG. 3A shows the FG signal, and waveform (b) in FIG. 3A shows a counted value of the timer counter 6. As shown waveform (b), during a counting operation of the timer counter 6, a difference between counted values a and c at the timings of the rises of successive FG signal pulses corresponds to a period of the FG signal. Corresponding to the period of the FG signal, the speed error signal is generated in a manner described later.

Meanwhile, the microcomputer 1 is not always in a waiting state for an input of the FG signal but performs other operations. Accordingly, even if the FG signal arrives during the other operations, the microcomputer 1 cannot take in a counted value of the time counter 6 to store the same immediately. Therefore, if the counted value is stored in, for example, the RAM 3 after an operation being executed by the microcomputer 1 is completed, the period of the FG signal cannot be correctly measured.

Thus, the independent ICR 7 is provided to immediately store a counted value of the time counter 6 in the ICR 7 at a timing of the edges of the FG signal pulses, and calculate the period of the FG signal through a predetermined interrupt operation after an operation being executed by the microcomputer 1 is completed, in order to obtain an accurate FG signal period.

Now, referring to FIG. 2, an input capture interrupt (FG interrupt) operation according to one embodiment of the present invention will be described When the FG interrupt operation is performed, first in the step S1, it is judged whether the edge of FG signal pulse is at the rising or falling edge. By incrementing the contents of a predetermined register every time the FG interrupt is performed, it becomes possible to judge whether the FG signal is the rising or falling edge by a value of the register being odd or even. If the FG signal edge is rising, a value is obtained by subtracting a counted value of the timer counter 6 at a previous rise time which has been stored in a register $R_2$ (not shown) in the RAM 3, from the contents of the ICR 7 at that time, that is, a counted value corresponding to the edge of the latest FG signal pulse stored in the ICR 7 is stored in a register $R_3$ (not shown) in the RAM 3 (step S2), and the above contents of the ICR 7 are transferred to and stored in the register $R_2$ (step S3). Then, the CPU 2 waits for a subsequent operation.

On the other hand, if it is judged in the step S1 that the edge is falling, a value is obtained by subtracting a counted value of the timer counter 6 at a previous fall timing which has been stored in a register $R_4$ (not shown) in the RAM 3, from the contents of the ICR 7 at that time is stored in the register $R_3$ (step S4), and the above described contents of the ICR 7 are transferred to and stored in the register $R_4$ (step S5). Then, the CPU 2 waits for a subsequent operation.

Accordingly, a period from a rise of one pulse of the FG signal to a rise of a subsequent pulse thereof shown in FIG. 3A (for example "c-a", "e-c" of FIG. 3B and a period from a fall of one pulse to a fall of a subsequent pulse (for example "d-b", "f-d" of FIG. 3B are independently and alternately obtained, and stored in the register $R_3$.

Next, in the processing following the step S6, a speed error signal CSP is generated based on the contents of the register $R_3$. FIG. 4 is a timing chart for schematically explaining a principle for generating the speed error signal CSP of the capstan motor.

Waveform (a) in FIG. 4 depicts the FG signal corresponding to a rotational speed of the capstan motor and waveforms (b) and (c) in this figure each show a relation between a fluctuation of the rotational speed of the capstan motor and an amplitude of the speed error signal CSP generated in response thereto. In these waveforms, the minimum voltage value that the speed error signal supplied to a driving system of the motor can actually take is 0 V and the maximum voltage value thereof is a predetermined value (for example 5 V). In addition, in the digital servo system, the amplitude of the speed error signal is represented by the number n of bits of the digital speed error signal, "0" corresponding to the above described minimum voltage value (0 V) and "$2^n-1$" corresponding to the above described maximum voltage value (5 V). Furthermore, in waveforms (b) and (c), a period "Td" in which the amplitude of the speed error signal takes the minimum value 0 is referred to as "bias period" for setting a target speed. A period "Ts" in which the amplitude of the speed error signal changes from the minimum value 0 to the maximum value "$2^n-1$" is referred to as "lock range" for determining a range in which a capturing operation of the speed error signal is performed.

Described in more detail, as is clear from FIG. 4, when the capstan motor is correctly rotating at a predetermined rotational speed, the amplitude of the speed error signal is fixed at an almost intermediate point "A" between the minimum value 0 and the maximum value "$2^n-1$", so that the servo control is performed in response to the speed error signal having an amplitude of about $(2^n-1)/2$. The servo control allows the above described predetermined rotational speed to be maintained. This intermediate point "A" is referred to as a lock point hereinafter.

However, as the capstan motor starts increasing its operational speed, the amplitude of the speed error signal is accordingly decreased from the above described lock point "A". More specifically, a servo signal supplied to the driving system of the capstan motor is decreased and force for restraining the rotation of the motor is applied, so that the increased rotational speed returns to a predetermined speed. On the contrary, when the rotational speed of the capstan motor is decreased from the predetermined speed, it is clear that the amplitude of the error signal is accordingly increased from the lock point "A". Consequently, the servo signal supplied to the driving system of the capstan motor is increased and the force for increasing the rotation of the motor is applied, so that the decreased rotational speed returns to the predetermined speed. Such a digital servo control is described in detail in Japanese Patent Laying-Open No. 63-208107.

As is clear from the foregoing description and from FIG. 4, the amplitude of the speed error signal CSP is determined by the following equations based on the bias period Td, the lock range Ts and the contents of the register $R_3$ (referred to as $R_3$ hereinafter) which are the data of the FG signal period.

Figure 2:
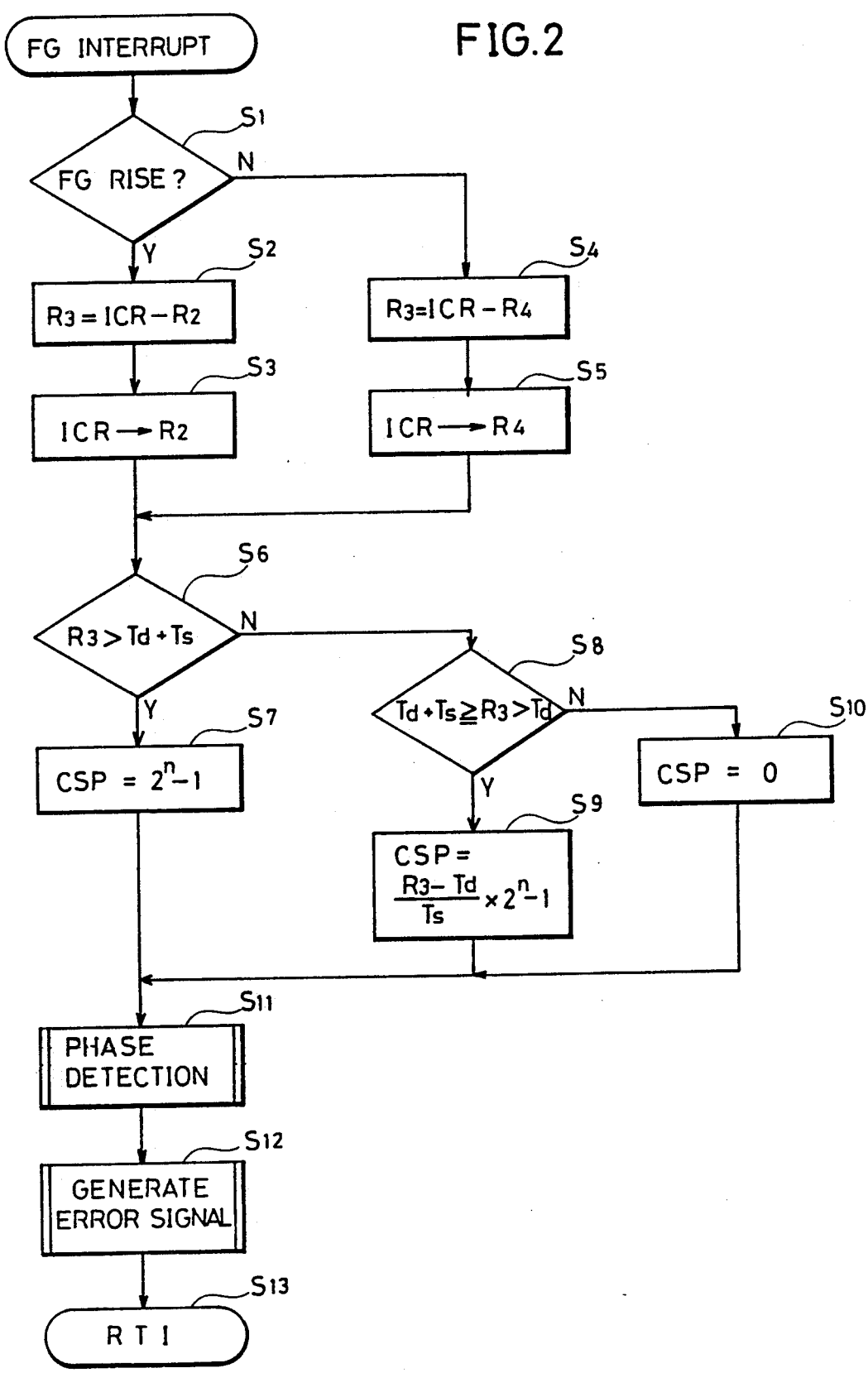
FIG. 2 is a flow chart showing an outline of a FG interrupt processing according to one embodiment of the present invention.

When $Td + Ts < R_3$, $CSP = 2^n - 1$
When $R_3 \leq Td$, $CSP = 0$
When $Td < R_3 \leq Td + Ts$, $CSP = (R_3 - Td)/Ts \times (2^n - 1)$ Returning to the flow chart of FIG. 2 first in the step S6, it is judged whether a condition $R_3 > Td + Ts$ is satisfied or not. If the condition is satisfied, $2^n - 1$ is determined as a speed error signal from the above described equations (step S7). On the other hand, if the condition is not satisfied, it is judged whether a condition $Td < R_3 \leq Td + Ts$ is satisfied or not in the step S8. If the condition is satisfied, $CSP = (R_3 - Td)/Ts \times (2^n - 1)$ is determined as a speed error signal from the above described equations (step S9), and if it is not satisfied, $CSP = 0$ is determined as a speed error signal (step S10).

Thereafter, in the step S11, a phase error signal of the capstan motor is generated separately, and in the step S12, the speed error signal which, e.g., was obtained as described above and the phase error signal are combined to generate a rotary error signal, i.e. a digital servo signal. Thereafter, the CPU 2 is returned from the FG interrupt (step S13).

Such combination of the speed error signal and the phase error signal is described in USSN 153 060 filed Feb. 8, 1988, now U.S. Pat. No. 4,885,793 issued Dec. 5, 1989 by the assignee of the present application.

As the foregoing, according to the embodiments of the present invention, the speed error signal is generated corresponding to a period from a rise of one FG signal pulse to a rise of a subsequent pulse, and a period from a fall of one FG signal pulse to a fall of a subsequent pulse, so that the sampling frequency for the digital servo control can be substantially doubled even if a duty ratio of the FG signal is not 50%, which enables a correct control of the rotational speed of the capstan motor.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital servo system for controlling a rotational speed of a rotary body (10), comprising:
   FG signal generating means (12) for generating an FG signal comprising a plurality of successive pulses and having a frequency proportional to the rotational speed of said rotary body,
   first measuring means (1) for measuring a first period from a rise of one pulse of said FG signal to a rise of a subsequent pulse of said FG signal,
   second measuring means (1) for measuring a second period from a fall of one pulse of said FG signal to a fall of a subsequent pulse of said FG signal,
   means (1) for generating a speed error signal with respect to the rotational speed of said rotary body by alternately using the first or the second period measured by said first measuring means or said second measuring means, and
   means (9) for driving a rotation of said rotary body in response to said speed error signal.

2. A digital servo system according to claim 1, further comprising:
   a timer counter (6) repeating a counting operation of counting a clock,
   an input capture register (7) for immediately storing a counted value of said timer counter at a timing of the rise and the fall of the pulse of said FG signal.

3. A digital servo system according to claim 2, wherein
   said first measuring means comprises:
      a first register ($R_2$) for storing the counted value of said timer counter at the rising time of a previous pulse of the FG signal,
      means (2) for obtaining said first period by subtracting the contents of said input capture register and said first register,
      means (2) for transferring the contents of said input capture register to said first register after said subtraction,
   said second measuring means comprises:
      a second register ($R_4$) for storing the counted value of said timer counter at the falling time of a previous pulse of the FG signal,
      means (2) for obtaining said second period by subtracting the contents of said input capture register and said second register,
      means (2) for transferring the contents of said input capture register to said second register after the subtraction.

4. A digital servo system according to claim 3, further comprising a third register ($R_3$) for alternately storing said first period and said second period.

5. A digital servo system according to claim 4, wherein said speed error signal generating means comprises means for determining an amplitude of a digital speed error signal CSP of n (n is a positive integer) bits based on said first or second period $R_3$ and a predetermined bias period Td and a predetermined lock range Ts.

6. A digital servo system according to claim 5, wherein said amplitude determining means generates a signal of $CSP = 2^n - 1$ when $Td + Ts < R_3$, a signal of $CSP = 0$ when $R_3 \leq Td$, and a signal of $CSP = (R_3 - Td)/Ts \times (2^n - 1)$ when $Td < R_3 \leq Td + Ts$.

7. A digital servo system according to claim 1, wherein said rotary body is a capstan motor of a video tape recorder.

* * * * *